UNITED STATES PATENT OFFICE.

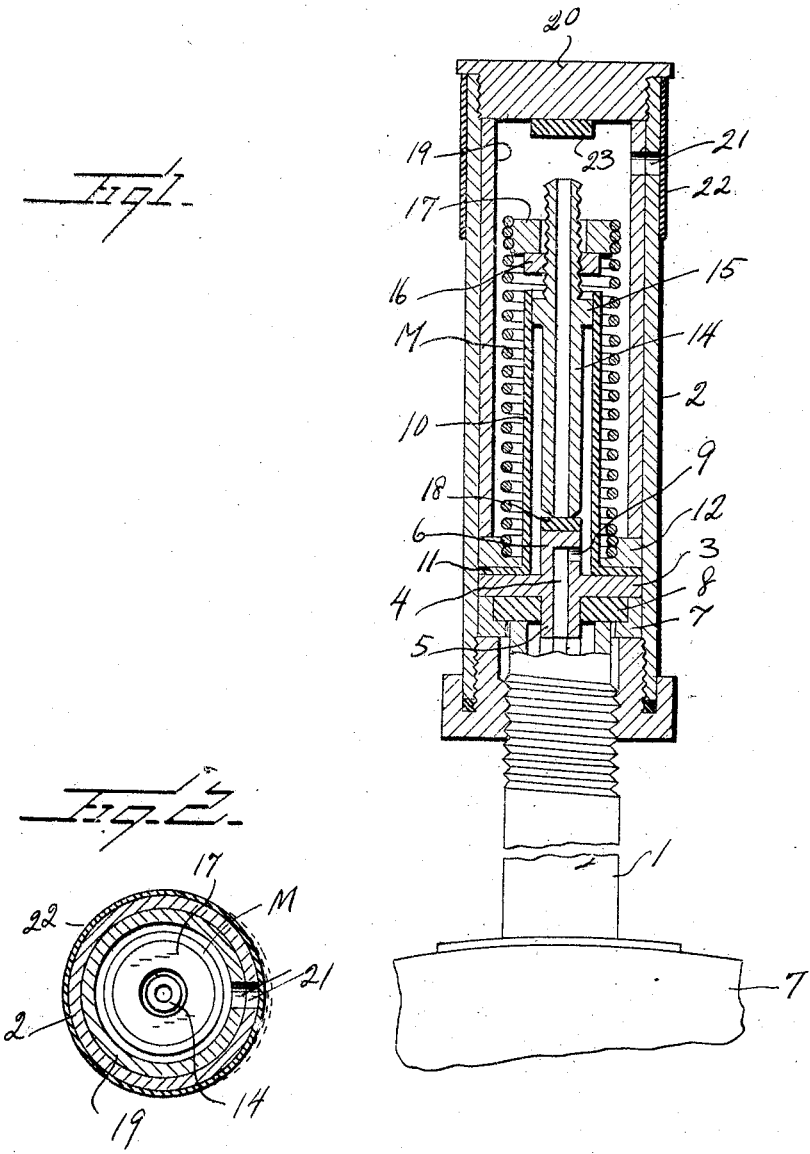

JOSEPH P. KELLEY, OF MEADE, KANSAS.

SIGNAL.

1,368,400.　　　　　Specification of Letters Patent.　　Patented Feb. 15, 1921.

Application filed June 12, 1920. Serial No. 388,470.

*To all whom it may concern:*

Be it known that I, JOSEPH P. KELLEY, a citizen of the United States, residing at Meade, in the county of Meade and State of Kansas, have invented certain new and useful Improvements in Signals, of which the following is a specification, reference being had to the accompanying drawings.

This invention relates to certain improvements in signals and has relation more particularly to a device of this general character of an audible type, and it is an object of the invention to provide a novel and improved device of this general character which is adapted to automatically operate to indicate low or lowering pressure of air or other fluid or gas under confinement.

Another object of the invention is to provide a novel and improved device of this general character particularly adapted for use in connection with a pneumatic tire or other inflatable body and which operates automatically to indicate when the pressure within the tire or other body is lowering or has become low and which reduction of pressure may be caused by punctures, pinches and the like.

An additional object of the invention is to provide a novel and improved device of this general character which also may be employed with facility in connection with a pneumatic tire or other inflatable body to sound a signal when the pressure within said tire or body is sufficient for safe use.

The invention consists in the details of construction and in the combination and arrangement of the several parts of my improved signal whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in elevation and partly in section illustrating a signal constructed in accordance with an embodiment of my invention and in applied position, and Fig. 2 is a transverse sectional view taken substantially through the upper portion of the device as illustrated in Fig. 1.

As disclosed in the accompanying drawings, 1 denotes a valve stem of a conventional type operatively engaged with a pneumatic tire T or other inflatable body. Threaded upon the extended portion of the stem 1 is a sleeve 2. The inner or connected portion of the sleeve 2 is intersected by the disk or partition 3 provided with a central opening 4 defined by the oppositely directed nipples 5 and 6. The depending nipple 5 is surrounded by an annular member or washer 7 of a major diameter less than the diameter of the disk or partition 3 and the marginal portions of the disk or partition 3 and the annular member or washer 7 coact with the gasket 8 preferably of rubber which engages the outer end of the stem 1, whereby an air-tight connection is provided between the stem 1 and the sleeve 2.

A wall of the upper nipple 6 is provided with a port 9 while the portion of said nipple 6 above the port 9 is closed. The port 9 is in communication with the interior or bore of an elongated rubber tube 10. The inner end of the tube 10 is defined by an outstanding annular flange 11 seating upon the upper or outer face of the partition or disk 3. The flange 11 is clamped to the partition or disk 3 by the annular member 12 within the sleeve 2, whereby the tube 10 is effectively maintained in applied position.

Extending axially of the tube 10 and entering therein through the outer end thereof is a stem 14. The major portion of the stem 14 within the tube 10 is of a maximum diameter less than the diameter of the bore of the tube 10 and the outer portion of said stem 14 is provided with an enlargement 15 arranged within the tube 10 and to which enlargement the open end portion of the tube 10 is secured.

The portion of the stem 14 outwardly of the enlargement 15 and exteriorly of the tube 10 is provided with peripheral threads with which is engaged the nut or stop 16. This extended or interior end portion of the stem 14 is disposed through the central opening defined by an annular member 17. The member 17 is secured to the outer end portion of a contractile member M herein disclosed as a coiled spring, and the opposite end of said member is secured to the annular member 12. The contractile member M operates to constantly urge inwardly the annular member 17, whereby said member is constantly in engagement with the nut or stop 16.

The stem 14 is tubular with its bore open at the opposite ends thereof and the inner end of said stem, when at the limit of its inward movement, contacts with a pad or elastic member 18 mounted upon the outer end of the nipple 6 so that when the stem 14 is in such position, the bore of the stem is closed.

Snugly fitting within the sleeve 2 is a bushing 19 which engages the annular member 12 and which surrounds the contractile member M, so that the sleeve 14 and the annular member 17 are free to have movement longitudinally of said bushing.

The outer end of the bushing 19 terminates inwardly of the outer end of the sleeve 2 and said bushing is maintained in applied position by the cap plug 20 threaded within the outer end portion of the sleeve 2 and engaging the adjacent end of the bushing 19.

The walls of the sleeve 2 and the bushing 19 adjacent the outer ends thereof are provided with the registering ports 21 which are normally closed by a rubber band 22 encircling the sleeve 2, and held in position by a spring.

The central portion of the cap plug 20 is provided with the pad or yieldable member 23 with which the outer end of the stem 14 is adapted to engage to close the flow through said stem 14.

When my improved device is applied to a tire or other body under inflation, the pressure of the fluid within the tube 10 and against the head or enlargement 15 of the stem 14 will force said stem 14 and annular member 17 outwardly until the outer end of the stem 14 is in contact with the pad or yieldable member 23, whereby flow through the stem 14 is closed.

When the pressure within the tire or other body lowers, as the result of a puncture, pinch, or from any other cause, the stem 14 will move inwardly, whereupon the air or other fluid under pressure will pass from the tube 10 through the stem 14 into the upper portion of the stem 2 or bushing 19 and out through the registering ports 21, resulting in an audible signal or whistling sound. The signal or whistling will continue until the pressure within the tire or other inflated body has been reduced sufficiently to permit the inner end of the stem 14 to engage the pad or elastic member 18, resulting in the stem 14 being closed.

By adjusting the nut or stop 16 to different positions along the outer end portion of the stem 14, the pressure at which the inner end of the stem 14 will be set or closed may be regulated or varied as preferred.

The rubber band 22, in addition to facilitating the production of the audible signal or whistle, also operates to protect all of the working parts of my improved device from dust, mud, water and other foreign matter.

My improved device can also be employed to determine if the inflation of a tire or other body is above the danger point. When used for this purpose, the nut or stop 16 is adjusted on the stem 14 in accordance with the pressure required and the device applied. If the signal does not operate, the air within the tire or other body is permitted to escape and the device again applied and these operations are continued until the signal or whistle is caused to operate, whereupon it will be at once understood that the pressure within the tire or other inflatable body is below the danger point. When the signal begins to operate, the device is removed so that there will not be any undue decrease of the air pressure below the pressure desired.

From the foregoing description it is thought to be obvious that a signal constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A signal of the class described comprising a tubular member adapted for communication with a body adapted to contain a fluid under pressure, a tubular stem mounted therein for endwise movement, the bore of said stem being open at opposite ends, means carried by the tubular member for closing the bore of said stem when at the limit of its movement in either direction, and means for automatically moving said tubular stem in one direction upon decrease of pressure within the body with which the tubular member communicates, said tubular member being provided with a port adapted for communication with the atmosphere.

2. A signal of the class described comprising a tubular member adapted for communication with a body adapted to contain a fluid under pressure, a tubular stem mounted therein for endwise movement, the bore of said member being open at opposite ends, means for closing the bore of said stem when at the limit of its movement in either direction, means for automatically moving said tubular stem in one direction upon decrease of pressure within the body with which the tubular member communicates, said tubular member being provided with a port adapted for communication with the atmosphere, and an elastic member overlying said port to produce an audible signal.

3. A signal of the class described comprising a tubular member adapted for communication with a body adapted to contain a fluid under pressure, a tubular stem mounted therein for endwise movement, the bore of said member being open at opposite ends, means for closing the bore of said stem when at the limit of its movement in either direction, means for automatically moving said tubular stem in one direction upon decrease of pressure within the body with which the tubular member communicates, said tubular member being provided with a port adapted for communication with the atmosphere, a member intersecting the tubular member inwardly of the stem and provided with an opening, and oppositely directed nipples substantially defining said openings, one of said nipples being disposed in a direction away from the body to which the tubular member is applied and constantly in communication with the interior of the tubular member.

4. A signal of the class described comprising a tubular member adapted for communication with a body adapted to contain a fluid under pressure, a tubular stem mounted therein for endwise movement, the bore of said member being open at opposite ends, means for closing the bore of said stem when at the limit of its movement in either direction, means for automatically moving said tubular stem in one direction upon decrease of pressure within the body with which the tubular member communicates, said tubular member being provided with a port adapted for communication with the atmosphere, a member intersecting the tubular member inwardly of the stem and provided with an opening, and oppositely directed nipples substantially defining said openings, one of said nipples being disposed in a direction away from the body to which the tubular member is applied and constantly in communication with the interior of the tubular member, and a member carried by said nipple with which the adjacent end of the stem contacts when at the limit of its movement in a direction toward said nipple, whereby the bore of the stem is closed.

5. A signal of the class described comprising a tubular member adapted for communication with a body adapted to contain a fluid under pressure, a tubular stem mounted therein for endwise movement, the bore of said member being open at opposite ends, means for closing the bore of said stem when at the limit of its movement in either direction, means for automatically moving said tubular stem in one direction upon decrease of pressure within the body with which the tubular member communicates, said tubular member being provided with a port adapted for communication with the atmosphere, and means for constantly urging the stem in one direction comprising an annular member surrounding an end portion of the stem and a contractile member engaged therewith, said stem being provided with an enlargement with which said annular member contacts.

6. A signal of the class described comprising a tubular member adapted for communication with a body adapted to contain a fluid under pressure, a tubular stem mounted therein for endwise movement, the bore of said member being open at opposite ends, means for closing the bore of said stem when at the limit of its movement in either direction, means for automatically moving said tubular stem in one direction upon decrease of pressure within the body with which the tubular member communicates, said tubular member being provided with a port adapted for communication with the atmosphere, and means for constantly urging the stem in one direction comprising an annular member surrounding an end portion of the stem and a contractile member engaged therewith, said stem being provided with an enlargement with which said annular member contacts, said enlargement being adjustable lengthwise of the stem.

In testimony whereof I hereunto affix my signature.

JOSEPH P. KELLEY.